(12) United States Patent
Maruko et al.

(10) Patent No.: US 6,465,573 B1
(45) Date of Patent: Oct. 15, 2002

(54) SOLID GOLF BALL

(75) Inventors: Takashi Maruko; Hisashi Yamagishi; Yutaka Masutani, all of Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 13 days.

(21) Appl. No.: 09/618,159

(22) Filed: Jul. 17, 2000

(30) Foreign Application Priority Data

Jul. 26, 1999 (JP) ............................................ 11-210293

(51) Int. Cl.[7] ................................................ A63B 37/00
(52) U.S. Cl. ...................... 525/130; 525/92 A; 525/177; 525/201; 525/221; 473/373; 473/374; 473/376
(58) Field of Search ................................ 473/373, 374, 473/376; 525/92 A, 130, 177, 201, 221

(56) References Cited

U.S. PATENT DOCUMENTS 5,733,974 A * 3/1998 Yamada
5,965,669 A * 10/1999 Cavallaro
5,967,907 A * 10/1999 Takemura
5,994,470 A * 11/1999 Tanaka

FOREIGN PATENT DOCUMENTS

| JP | 8-336617 | 12/1996 |
| JP | 8-336618 | 12/1996 |
| JP | 9-56848 | 3/1997 |
| JP | 9-299510 | 11/1997 |
| JP | 11-417 | 1/1999 |
| JP | 11-4916 | 1/1999 |

* cited by examiner

Primary Examiner—David J. Buttner
(74) Attorney, Agent, or Firm—Sughrue Mion, PLLC

(57) ABSTRACT

A solid golf ball comprising a core, an intermediate layer, and a cover is improved in rebound, distance and feel when the intermediate layer is comprised of a thermoplastic resin in admixture with rubber powder.

18 Claims, No Drawings

SOLID GOLF BALL

This invention relates to multi-piece solid golf balls featuring a high rebound and pleasant feel when hit.

BACKGROUND OF THE INVENTION

Prior art solid golf balls include multilayer structure golf balls in which the core and/or the cover is formed of multiple layers as disclosed in JP-A 8-336617, 8-336618, 9-56848, 9-299510, 11-417, and 11-4916.

The solid golf balls are formed into a multilayer structure for the purposes of acquiring an equivalent feel to wound golf balls and improving distance. In general, making much of feel often fails to meet the distance requirement whereas satisfying distance often leads to a poor feel. There is a desire to have a golf ball which finds a better compromise between distance and feel.

SUMMARY OF THE INVENTION

An object of the invention is to provide a solid golf ball which is resilient enough to increase the distance and gives a pleasant feel when hit.

The invention pertains to a multi-piece solid golf ball having at least three layers. It has been found that when a layer comprised of a thermoplastic resin in admixture with rubber powder is provided other than the cover, there is obtained a solid golf ball which is softer and more resilient than prior art golf balls. More improvements are made when a highly resilient thermoplastic resin having a low glass transition temperature is admixed with a sufficient amount of a hard rubber powder obtained from a rubber composition having a relatively high content of zinc diacrylate.

In one aspect, the invention provides a solid golf ball comprising a core, an intermediate layer, and a cover wherein the intermediate layer is comprised of a thermoplastic resin in admixture with rubber powder.

In another aspect, the invention provides a solid golf ball comprising a core, a mantle layer, an intermediate layer, and a cover wherein the mantle layer and/or intermediate layer is comprised of a thermoplastic resin in admixture with rubber powder.

In one preferred embodiment, the thermoplastic resin is a polyester resin, polyurethane resin, polyurethane ester resin, polyamide elastomer or a mixture thereof, and has a glass transition temperature (Tg) of up to $-10°$ C. and a resilience of at least 50. The thermoplastic resin and the rubber powder are preferably admixed in a weight ratio of from 75:25 to 25:75. The rubber powder is preferably obtained by vulcanizing a rubber composition comprising 100 parts by weight of polybutadiene and 30 to 45 parts by weight of zinc diacrylate. The rubber powder preferably has a mean particle size of 0.7 to 3 mm.

DESCRIPTION OF THE PREFERRED EMBODIMENT

The solid golf ball of the invention has a core, an intermediate layer enclosing the core, and a cover enclosing the intermediate layer. In the preferred solid golf ball, a mantle layer intervenes between the core and the intermediate layer.

The core may be formed of a rubber composition, a thermoplastic resin or a mixture thereof. The rubber composition may be of any desired formulation, preferably a rubber composition comprising polybutadiene as a base. The polybutadiene used herein is preferably 1,4-cis-polybutadiene containing at least 40% of cis structure. In the base rubber, natural rubber, polyisoprene rubber or styrene-butadiene rubber may be blended with the polybutadiene if desired. Increasing the rubber component is effective for improving the rebound of golf balls.

In the rubber composition, a crosslinking agent may be blended with the rubber component. Exemplary crosslinking agents are zinc and magnesium salts of unsaturated fatty acids such as zinc dimethacrylate and zinc diacrylate, and esters such as trimethylpropane methacrylate. Of these, zinc diacrylate is preferred. The crosslinking agent is preferably used in an amount of at least about 10 parts and up to about 40 parts by weight per 100 parts by weight of the base rubber.

Also a vulcanizing agent is generally blended in the rubber composition. Organic peroxides are preferred vulcanizing agents. Such peroxides are commercially available, for example, under the trade name of Percumyl D and Perhexa 3M from Nippon Oil and Fats K.K. The vulcanizing agent may be blended in an amount of at least about 0.6 part and up to about 2 parts by weight per 100 parts by weight of the base rubber.

If necessary, antioxidants and specific gravity adjusting fillers such as zinc oxide and barium sulfate are blended in the rubber composition.

The core may be either a single core or a multilayer core of two or more layers. In the latter case, for example, an inner core formed of a rubber composition is enclosed with an outer core formed of a thermoplastic resin, typically ionomer resin.

Preferably, the core has a diameter of at least 25 mm, especially at least 30 mm and up to 39 mm, especially up to 37 mm. The core has a deflection of at least 2.0 mm, especially at least 2.5 mm and up to 5.0 mm, especially up to 4.5 mm, when a load of 100 kg is applied thereto. With the diameter and deflection under 100-kg load of the core set within the above ranges, the purpose of improving the rebound and feel of golf balls at the same time is more effectively accomplished.

According to the invention, the intermediate layer is formed around the core. The purpose of the invention is ore effectively accomplished by enclosing the core with the mantle layer and enclosing the mantle layer with the intermediate layer.

The mantle and intermediate layers each are formed of thermoplastic resins. Useful thermoplastic resins include polyurethane resins (thermoplastic polyurethane elastomers), polyester resins (thermoplastic polyester elastomers), polyurethane ester resins, thermoplastic polyamide elastomers, and ionomer resins. They are commercially available under the trade name of Pandex (thermoplastic polyurethane resins by Dai-Nihon Ink & Chemicals K.K.), Hytrel (thermoplastic polyester resins by Dupont-Toray K.K.), Surlyn (ionomer resins by Dupont), Himilan (ionomer resins by Dupont-Mitsui Polychemical K.K.), Rilsan (polyamide resins by Dupont-Toray K.K.), and Pebax (thermoplastic polyamide elastomers by Toray K.K.).

In the solid golf ball of the invention, either one or both of the mantle layer and the intermediate layer are formed of a thermoplastic resin in admixture with rubber powder. The thermoplastic resin used herein is preferably a polyester resin, polyurethane resin, polyurethane ester resin, polyamide elastomer or a mixture thereof. These thermoplastic resin should preferably have a glass transition temperature (Tg) of up to $-10°$ C., more preferably up to $-30°$ C., and especially up to $-40°$ C., and a resilience of at least 50, more preferably at least 60. A thermoplastic resin having a higher Tg and a lower resilience would fail to provide the ball with good rebound.

The rubber powder to be admixed with the thermoplastic resin may be formed of a rubber composition similar to the above-described core-forming rubber composition. Especially preferred is a rubber composition comprising polybutadiene, especially 1,4-cis-polybutadiene having at least 40% of cis structure as a rubber component and zinc diacrylate as a crosslinking agent. It is recommended to use a hard rubber powder obtained from a rubber composition comprising 100 parts by weight of polybutadiene and about 30 to 45 parts, especially about 30 to 40 parts by weight of zinc diacrylate by vulcanizing at about 150 to 170° C. for about 10 to 30 minutes.

The rubber powder preferably has a mean particle size of at least 0.7 mm, especially at least 1.0 mm and up to 3.0 mm, especially up to 2.0 mm. A rubber powder having a too small particle size has an increased interfacial surface area which can be detrimental to resilience. Although a mean particle size in excess of 3.0 mm is not detrimental to ball performance, it is recommended for effective molding, especially injection molding to restrict the mean particle size to 3.0 mm or less.

Preferably the thermoplastic resin and the rubber powder are admixed in a weight ratio of from 75:25 to 25:75, more preferably from 60:40 to 25:75, most preferably from 60:40 to 30:70. A mixing ratio outside the range sometimes fails to achieve the object of the invention.

In the admixed layer of thermoplastic resin and rubber powder, an inorganic filler, plasticizer and other addenda are blended if necessary.

The thermoplastic resin in the admixed layer should preferably have a Shore D hardness of at least 20, especially at least 25 and up to 55, especially up to 50, as measured alone, that is, with the rubber powder removed.

In an embodiment of the invention having both the mantle layer and intermediate layer either one of which does not contain the rubber powder, the rubber powder-free layer should preferably have a Shore D hardness of at least 55, especially at least 60 and up to 70, especially up to 68, and higher than the hardness of the admixed layer.

Preferably the mantle layer has a gage (or radial thickness) of at least 0.5 mm, especially at least 0.8 mm and up to 3.0 mm, especially up to 2.5 mm. The intermediate layer preferably has a gage of at least 1.0 mm, especially at least 1.5 mm and up to 7.0 mm, especially up to 5.0 mm when the mantle layer is present; and a gage of at least 1.0 mm, especially at least 1.5 mm and up to 8.0 mm, especially up to 6.0 mm when the mantle layer is absent.

The cover may be formed of thermoplastic resins including ionomer resins and thermoplastic elastomers, with the ionomer resins being preferred. The cover should preferably have a Shore D hardness of at least 40, especially at least 45 and up to 70, especially up to 65, and yet higher than the hardness of the admixed layer. Also the cover should preferably have a gage of at least 0.5 mm, especially at least 0.8 mm and up to 3.0 mm, especially up to 2.5 mm. Additives such as inorganic fillers are optionally blended in the cover.

Like ordinary golf balls, the golf ball of the invention is provided on its surface with 300 to 600 dimples in a well-known arrangement.

The diameter and weight of the golf ball should comply with the Rules of Golf. Typically the golf ball has a diameter of not less than 42.65 mm, especially not less than 42.67 mm and not greater than 42.75 mm and a weight of not greater than 45.93 g, especially not greater than 45.90 g and not less than 45.10 g.

EXAMPLE

Examples of the invention are given below by way of illustration and not by way of limitation. All parts are by weight.

Examples 1–4 & Comparative Examples 1–4

Multi-piece solid golf balls were prepared by using the rubber composition shown in Table 1, the resin blend shown in Table 2, the resin/rubber powder composition shown in Table 3, and the rubber powder composition shown in Table 4, and combining them as shown in Table 5. The balls were examined for flight performance and feel by the following tests. The results are also shown in Table 5. The Shore D hardness, glass transition temperature (Tg) and resilience of the resins are shown in Table 6.

Flight performance

Using a swing robot, the ball was hit with a driver at a head speed of 45 m/sec. An initial velocity, carry and total were measured.

Feel

Three professional golfers actually hit the ball and rated the feel as excellent (Exc), good, average (Av) or poor.

TABLE 1

Rubber composition

| | Example | | | | Comparative Example | | | |
|---|---|---|---|---|---|---|---|---|
| Components (pbw) | 1 Core A | 2 Core B | 3 Core C | 4 Core D | 1 Core E | 2 Core F | 3 Core G | 4 Core H |
| JSR BR01 | 100 | 100 | 100 | 100 | 100 | 100 | 100 | 100 |
| Zinc diacrylate | 22 | 28 | 25 | 25 | 22 | 22 | 25 | 15 |
| Zinc oxide | 10 | 10 | 10 | 10 | 10 | 10 | 10 | 10 |
| Barium sulfate | 34.4 | 24.7 | 16.5 | 33.3 | 34.4 | 34.4 | 16.5 | 0 |
| Nocrack NS-6 | 0.2 | 0.2 | 0.2 | 0.2 | 0.2 | 0.2 | 0.2 | 0.5 |
| Dicumyl peroxide | 0.9 | 0.9 | 0.9 | 0.9 | 0.9 | 0.9 | 0.9 | 1.5 |

JSR BR01: polybutadiene by Japan Synthetic Rubber K. K.
Nocrack NS-6: antioxidant by Ouchi Sinko Chemical K. K.
Vulcanizing conditions: 155° C., 15 min.

TABLE 2

Resin blend

| Components (pbw) | Resin A | Resin B | Resin C | Resin D | Resin E | Resin F |
|---|---|---|---|---|---|---|
| Himilan 1557 | — | — | 30 | 25 | — | — |
| Himilan 1605 | — | 50 | — | 50 | — | — |
| Himilan 1706 | — | 50 | — | 25 | — | — |
| Himilan AM7317 | 50 | — | — | — | — | — |
| Himilan AM7318 | 50 | — | — | — | — | — |
| Surlyn 8120 | — | — | 70 | — | — | — |
| Hytrel 3078 | — | — | — | — | 100 | — |
| Hytrel 4047 | — | — | — | — | — | 100 |
| Titanium oxide | 5 | 5 | 5 | 5 | — | — |

Himilan: ionomer resin by Dupont-Mitsui Polychemical K. K.
Surlyn: ionomer resin by Dupont
Hytrel: polyester resin by Dupont-Toray K. K.

TABLE 3

Resin/rubber composition

| Components (pbw) | Resin G | Resin H | Resin I | Resin J | Resin K | Resin L |
|---|---|---|---|---|---|---|
| Himilan 1706 | — | — | — | — | — | 40 |
| Himilan 1605 | — | — | — | — | — | 40 |
| Hytrel 3078 | 55 | 35 | — | — | — | — |
| Hytrel 4047 | — | — | 50 | — | — | — |
| Hytrel 5556 | — | — | — | 79 | — | — |
| Pandex T-2180 | — | — | — | — | 50 | — |
| Rubber powder A | 45 | — | — | — | — | — |
| Rubber powder B | — | 65 | — | — | — | — |
| Rubber powder C | — | — | 50 | — | — | — |
| Rubber powder D | — | — | — | — | 50 | — |
| Rubber powder E | — | — | — | 21 | — | — |
| Rubber powder F | — | — | — | — | — | 20 |
| Monosizer DOP | 5 | 10 | 5 | — | 5 | — |

Pandex T-2180: urethane resin by Dai-Nihon Ink & Chemicals K. K.
Monosizer DOP: di(2-ethylhexyne) phthalate by Dai-Nihon Ink & Chemicals K. K.

TABLE 4

Rubber powder

| Components (pbw) | Rubber powder A | Rubber powder B | Rubber powder C | Rubber powder D | Rubber powder E | Rubber powder F |
|---|---|---|---|---|---|---|
| JSR BR01 | 100 | 100 | 100 | 100 | 100 | 100 |
| Zinc diacrylate | 35 | 35 | 33 | 31 | 29 | — |
| Methacrylic acid | — | — | — | — | — | 20 |
| Zinc oxide | 10 | 10 | 10 | 10 | 35 | 22 |
| Nocrack NS-6 | 0.2 | 0.2 | 0.2 | 0.2 | 0.2 | 0.2 |
| Dicumyl peroxide | 0.9 | 0.9 | 0.9 | 0.9 | 2.1 | 1.1 |
| Mean particle size (mm) | 1.2 | 0.8 | 1.5 | 1.2 | 0.25 | 0.60 |

Vulcanizing conditions: 155° C., 15 min.

TABLE 5

| | | Example | | | | Comparative Example | | | |
|---|---|---|---|---|---|---|---|---|---|
| | | 1 | 2 | 3 | 4 | 1 | 2 | 3 | 4 |
| Core | Material | Core A | Core B | Core C | Core D | Core E | Core F | Core G | Core H |
| | Diameter (mm) | 32.6 | 33.7 | 35.2 | 32.6 | 32.6 | 32.6 | 35.2 | 35.2 |
| | Weight (g) | 23.2 | 24.8 | 27.1 | 23.2 | 23.2 | 23.2 | 27.1 | 28.0 |

TABLE 5-continued

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
|  | Deflection under 100 kg load (mm) | 4.1 | 3.2 | 3.6 | 3.6 | 4.1 | 4.1 | 3.6 | 4.3 |
| Mantle layer | Material | Resin A | Resin H | — | Resin B | Resin A | Resin A | — | — |
|  | Diameter (mm) | 35.6 | 36.7 | — | 35.6 | 35.6 | 35.6 | — | — |
|  | Weight (g) | 28.2 | 31.3 | — | 28.3 | 28.3 | 28.3 | — | — |
|  | Shore D hardness | 68 | 45 | — | 65 | 68 | 68 | — | — |
| Intermediate layer | Material | Resin G | Resin A | Resin I | Resin K | Resin E | Resin J | Resin F | Resin L |
|  | Diameter (mm) | 38.6 | 39.7 | 39.0 | 38.6 | 38.6 | 38.6 | 39.0 | 39.0 |
|  | Weight (g) | 35.5 | 37.7 | 36.2 | 35.5 | 35.3 | 35.3 | 36.3 | 36.3 |
|  | Shore D hardness | 45 | 68 | 50 | 45 | 30 | 60 | 40 | 61 |
| Cover | Material | Resin B | Resin C | Resin B | Resin D | Resin B | Resin B | Resin B | Resin B |
|  | Diameter (mm) | 42.7 | 42.7 | 42.7 | 42.7 | 42.7 | 42.7 | 42.7 | 42.7 |
|  | Weight (g) | 45.4 | 45.1 | 45.2 | 45.4 | 45.2 | 45.4 | 45.4 | 45.3 |
|  | Shore D hardness | 65 | 51 | 65 | 62 | 65 | 65 | 65 | 65 |
| Flight Test, W#1 HS 45 m/s | Initial velocity (m/s) | 64.7 | 64.6 | 64.8 | 64.5 | 64.3 | 64.2 | 64.3 | 64.1 |
|  | Carry (m) | 207.6 | 208.2 | 205.6 | 207.1 | 204.1 | 203.7 | 203.3 | 201.9 |
|  | Total (m) | 227.4 | 226.2 | 227.0 | 225.7 | 224.3 | 222.4 | 224.7 | 222.4 |
| Feel |  | Exc | Exc | Good | Good | Good | Av | Av | Poor |

TABLE 6

Resin properties

|  | Shore D | Tg (° C.) | Resilience |
| --- | --- | --- | --- |
| Hytrel 2551 | 25 | 37 | 30.0 |
| Hytrel 3078 | 30 | −48 | 78.1 |
| Hytrel 4047 | 40 | −42 | 68.0 |
| Hytrel 4056 | 40 | −29 | 66.4 |
| Hytrel 4556 | 45 | −41 | 66.4 |
| Hytrel 4767 | 47 | −39 | 60.0 |
| Hytrel 5556 | 55 | 6.4 | 56.8 |
| Hytrel 6347 | 63 | 25 | 45.0 |
| Hytrel 7247 | 72 | 35 | 40.0 |
| Pandex T-2180 | 28 | −56 | 60.0 |
| Pandex T-2185 | 34 | −49 | 55.0 |
| Pandex T-2190 | 40 | −45 | 50.0 |
| Pandex T-2195 | 46 | −37 | 48.0 |
| Pandex T-2198 | 53 | −24 | 40.0 |
| Himilan 1605/Surlyn 8120 (50/50) | 53 | 61 | 45.8 |
| Himilan 1605/Himilan 1706 | 64 | 71 | 50.4 |

Tg: measured by DSC
Resilience: measured by Dunlop tripsometer

There has been described a solid golf ball having the mantle and/or intermediate layer formed of rubber powder-admixed thermoplastic resin so that the ball is resilient enough to increase the distance and gives a pleasant feel when hit.

Japanese Patent Application No. 11-210293 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solid golf ball comprising a core, an intermediate layer enclosing the core, and a cover enclosing the intermediate layer,
said intermediate layer being comprised of a thermoplastic resin in admixture with rubber powder, wherein said thermoplastic resin is selected from the group consisting of a polyester resin, polyurethane resin, polyurethane ester resin, and a mixture thereof, and has a glass transition temperature of up to −10° C. and a resilience of at least 50, and wherein the core is formed of a rubber composition and has a deflection of 2.0 to 5.0 mm when a load of 100 kg is applied thereto.

2. The solid golf ball of claim 1, wherein the intermediate layer has a gage of 1.0 to 8.0 mm and the cover has a gage of 0.5 to 3.0 mm.

3. The solid golf ball of claim 1 wherein said thermoplastic resin and said rubber powder are admixed in a weight ratio of from 75:25 to 25:75.

4. The solid golf ball of claim 1 wherein said rubber powder is obtained by vulcanizing a rubber composition comprising 100 parts by weight of polybutadiene and 30 to 45 parts by weight of zinc diacrylate.

5. The solid golf ball of claim 1 wherein said rubber powder has a mean particle size of 0.7 to 3 mm.

6. The solid golf ball of claim 1 wherein said rubber powder is formed of a rubber composition similar to the core-forming composition.

7. The solid golf ball of claim 1 wherein the admixed layer of the intermediate layer has a Shore D hardness of 20 to 55 as measured without the rubber powder.

8. The solid golf ball, of claim 7 wherein the cover is formed of thermoplastic resin having a Shore D hardness of 40 to 70 which is higher than that of the admixed layer thereof.

9. A solid golf ball comprising a core, a mantle layer enclosing the core, an intermediate layer enclosing the mantle layer, and a cover enclosing the intermediate layer, said mantle layer or said intermediate layer being comprised of a thermoplastic resin in admixture with rubber powder, wherein said thermoplastic resin is selected from the group consisting of a polyester resin, polyurethane resin, polyurethane ester resin, and a mixture thereof, and has a glass transition temperature of up to −10° C. and a resilience of at least 50, and wherein the core is formed of a rubber composition and has a deflection of 2.0 to 5.0 mm when a load of 100 kg is applied thereto.

10. The solid golf ball of claim 9 wherein said thermoplastic resin and said rubber powder are admixed in a weight ratio of from 75:25 to 25:75.

11. The solid golf ball of claim 6 wherein said rubber powder is obtained by vulcanizing a rubber composition comprising 100 parts by weight of polybutadiene and 30 to 45 parts by weight of zinc diacrylate.

12. The solid golf ball of claim 9 wherein said rubber powder has a mean particle size of 0.7 to 3 mm.

13. The solid golf ball of claim 9 wherein said rubber powder is formed of a rubber composition similar to the core-forming composition.

14. The solid golf ball of claim 9 wherein the admixed layer of the mantle layer or the intermediate layer has a Shore D hardness of 20 to 55 as measured without the rubber powder.

15. The solid golf ball of claim 14 wherein the rubber powder-free layer has a Shore D hardness of 55 to 70 which is higher than the hardness of admixed layer thereof.

16. The solid golf ball of claim 14 wherein the cover is formed of thermoplastic resin having a Shore D hardness of 40 to 70 which is higher than that of the admixed layer thereof.

17. The solid golf ball of claim 9 wherein the mantle layer has a gage of 0.5 to 3.0 mm and the intermediate layer has a gage of 1.0 to 7.0 mm.

18. The solid golf ball of claim 9 wherein the intermediate layer has a gage of 1.0 to 7.0 mm and the cover has a gage of 0.5 to 3.0 mm.

* * * * *